UNITED STATES PATENT OFFICE.

WILLIAM OSBORN STODDARD, OF NEW YORK, N. Y.

IMPROVEMENT IN PREPARATIONS OF BATTER OF EGGS.

Specification forming part of Letters Patent No. 167,587, dated September 7, 1875; application filed May 31, 1875.

*To all whom it may concern:*

Be it known that I, WILLIAM OSBORN STODDARD, of the city of New York, in the county of New York and State of New York, have invented a new and useful Preparation of Batter of Eggs, the nature of which is fully set forth in the following specification.

My invention has relation to the drying or desiccating of batter of eggs; and consists, first, in the process of drying or desiccating the moist batter under and by means of a forcible blast of air, and upon a rotating surface previously prepared with and effectually covered by a hardened and adhering film of batter of eggs; and, secondly, in the production of an improved article of manufacture— to wit, desiccated batter of eggs having the natural color and substantial qualities of the fresh moist batter, free from offensive odor, and dependent for such qualities upon the relative proportions or percentage of soluble fat and oil and soluble albumen remaining in the desiccated material, as hereinafter described, and specifically claimed.

For the purposes of my invention the batter, composed of the whites and yolks of eggs beaten together, is deprived of all its watery particles, and reduced to a fine powder or meal of minute and pure particles by being poured or permitted to flow or remain upon a rapidly-rotating surface, of any suitable form or design, said surface having been previously prepared, for the purposes of this invention, with a firmly dried and hardened adhesive coating or strong film of similar batter of eggs, and subjected, during the flow or continuance thereon of the batter of eggs so to be dried, and while in rotation, to a forcible drying and distributing blast or blasts of air, repeated layers of batter of eggs being thus deposited one over the other, and dried with continuous and marked advantage as to manufacture and the character of the material produced. The batter of eggs is in this manner prevented, while drying, from coming in contact with any foreign substance, metallic or otherwise, and forms its minute dry particles more purely, uniformly, minutely, and rapidly than by any other known process. and produces, commercially, at a low cost for manufacture, and in the best form for preservation, transportation, and subsequent use, the improved preparation or product of batter of eggs herein set forth and described.

In use, for cooking or otherwise, the addition, to a measure of this preparation, of the relative proportion of water, (lukewarm,) removed by the process of manufacture, almost immediately restores, by rapidly dissolving the preparation, the batter of eggs to its natural state before drying. This preparation will retain its form and properties for an indefinite time, and under all climatic changes, so long as kept dry.

I am well aware that the art of desiccating batter of eggs was known and practiced prior to the date of my invention; and I refer to the patent of Chas. A. La Mont, granted October 10 and November 28, 1865, as proper evidence of the state of the art previous to my invention.

The superiority of the product of my improved process consists, as found by careful investigation and analysis, in a difference in the proportions of the constituent elements of the desiccated batter from those of the product of other processes. The constituents of my improved product may be stated as follows: Moisture, 5.87 per cent.; fat and oil, (soluble in ether,) 42.78 per cent.; soluble albumen, 30.92 per cent.; other albuminous and organic matter, 16.95 per cent.; ash, 3.48 per cent.=100.

An analysis of the material produced according to the process described in the patents of La Mont, referred to, gives the following proportions: Moisture, 5.20 per cent.; fat and oil, (soluble in ether,) 38.92 per cent.; soluble albumen, 18.48 per cent.; other albuminous and organic matters, 33.98 per cent.; ash, 3.42 per cent.

My product, accordingly, is shown to contain a greater proportion of fat and oil soluble in ether and soluble albumen than La Mont's, and a lesser proportion of other albuminous and organic matters. Mine possesses the color, odor, and general characteristics of the fresh, moist batter, dissolves rapidly, and to a larger extent than the other, and leaves a fine flaky uniform sediment, while La Mont's dissolves but sparingly, and leaves a coarse, heavy deposit. It is, therefore, apparent and a correct inference that the improved character of the material produced under my process is owing to the retention of a larger proportion of the fats and oils and of the albumen in a soluble condition.

I claim—

1. The process of desiccating batter of eggs, consisting in drying the moist batter under and by means of a forcible blast of air, and upon a rotating surface previously prepared with and effectually covered by a hardened and adhering film of batter of eggs, substantially as described.

2. The product hereinbefore described, consisting of desiccated batter of eggs having the natural color and substantial qualities of the fresh, moist batter, free from offensive odor, and containing about the proportions of forty-two per cent. of fat and oil soluble in ether, and thirty per cent. of soluble albumen.

WILLIAM OSBORN STODDARD.

Witnesses:
   OTHO H. KLUMM,
   GEO. W. STERRITT.